Figure 1:
Figure 3:
Figure 5:
Figure 7:

Dec. 8, 1925.

A. B. COLBY 1,564,944

ATTACHMENT TERMINAL AND METHOD OF MAKING SAME

Filed May 19, 1924

INVENTOR
Allan B. Colby,
By Attorneys,
Fraser, Myers & Manley.

Patented Dec. 8, 1925.

1,564,944

UNITED STATES PATENT OFFICE.

ALLAN B. COLBY, OF PROVIDENCE, RHODE ISLAND, ASSIGNOR TO RAU FASTENER COMPANY, OF PROVIDENCE, RHODE ISLAND, A CORPORATION OF RHODE ISLAND.

ATTACHMENT TERMINAL AND METHOD OF MAKING SAME.

Application filed May 19, 1924. Serial No. 714,375.

*To all whom it may concern:*

Be it known that I, ALLAN B. COLBY, a citizen of the United States of America, residing in the city of Providence, county of Providence, and State of Rhode Island, have invented certain new and useful Improvements in Attachment Terminals and Methods of Making Same, of which the following is a specification.

This invention relates to an improved attachment terminal of general application, more particularly adapted for use as a tip for the end of a wire forming an electrical connection, and a method of making the same. Although not restricted to any particular field of usefulness, it is well suited to be employed as an electric terminal of the character frequently employed in telephone sub-station installations, radio hook-ups, and the like.

One object of the invention is to provide an attachment terminal of the character indicated which shall be of simple and inexpensive construction, yet relatively durable and well suited to perform its intended function.

It is an important feature of the invention that the dimensions of its two ends may be so proportioned that one end may be of a proper size to receive a wire or other object to which it may be attached, and the other end may be of a size best suited to cooperate with a binding post, support or other connecting element, with which the attachment terminal is intended to cooperate.

Figure 2:
Figure 4:
Figure 6:
Figure 8:

In the drawings illustrating preferred forms of the invention,

Figures 1 and 2, respectively, are a face view and an edge view of a blank from which a terminal may be produced.

Figures 3, 5, 7 and 9, are side views, and Figures 4, 6, 8 and 10, are corresponding end views, illustrating the results of a plurality of drawing or other suitable forming operations, whereby the blank of Figures 1 and 2 is converted into tubular form.

Figure 9:
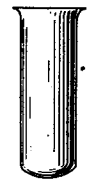
Figure 11:
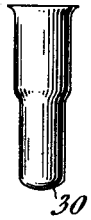
Figure 10:
Figure 12:

Figures 11 and 12, respectively, are a side view and an end view, illustrating a subsequent step by which the tubular structure of Figures 9 and 10 is converted into one having end portions of different diameters.

Figure 13:
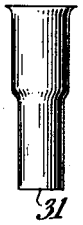
Figure 14:

Figures 13 and 14, respectively, are a side view and an end view of the tubular structure of Figures 11 and 12, after the closed end thereof has been removed.

Figure 15:
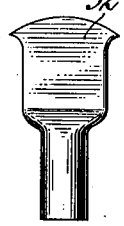
Figure 16:
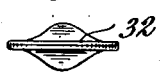

Figures 15 and 16, respectively, are a side view and an end view, illustrating a subsequent step, which consists in the flattening of one end of the structure.

Figure 17:
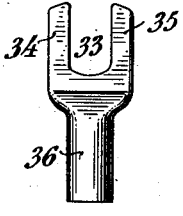
Figure 18:

Figures 17 and 18, respectively, are a side view and an end view of a finished tip formed from the structure of Figures 15 and 16 by the removal of a part of the material of the flattened portion of the structure and trimming away surplus parts.

The tubular structure illustrated in Figures 9 and 10 of the above described drawings is produced from a suitable blank, such as that illustrated in Figures 1 and 2, in any appropriate manner as by a series of drawing operations, the form of the structure at the end of the intermediate steps in the process being represented by Figures 3 to 8, inclusive. This elongated thimble-shaped structure, is converted by means of a subsequent drawing operation into a structure having end portions of different diameters, as indicated in Figures 11 and 12. One end of the structure, preferably the end of the larger diameter, is subsequently flattened as at 32, Figures 15 and 16. When the larger end is selected as the one to be flattened, the closed end 30 of the structure of Figures 11 and 12 may first be removed to form an intermediate structure having an open end 31, as indicated in Figures 13 and 14.

The finished terminal is produced from the structure of Figures 15 and 16 by removing a portion of the material at its flattened end to provide an open portion adapted to receive a binding post or other element with which an attachment is to be effected. In the preferred form of the invention, this is accomplished by trimming off surplus parts and slotting the flattened end of the structure, as at 33, Figure 17, thereby producing an attachment known as a spade tip having tines or prongs 34, 35, adapted to straddle the binding post.

The opposite end of the tubular structure comprises a socket 36 adapted to receive the end of a wire or other object which may be secured therein in any appropriate manner as by soldering.

It will be apparent that the relative diameters of the two ends of the tubular structure are independent of each other. The end which forms the socket portion 36 may be made of the proper diameter to accommodate the diameter of the wire or other object to which it is intended to be secured. The end of the structure from which the spade tip is formed, may be of a suitable diameter to provide prongs of any desired width separated by a space of appropriate size to receive the binding post, support or other attaching element with which a connection is desired to be made.

The relative independence as to the size of each end of the structure, whereby each end may be of dimensions best suited to accomplish its intended purposes, is one of the important features of the invention.

It will be apparent that either end of the structure may be flattened to form the part of the tip intended to cooperate with a binding post or other connecting element, and either end may be left of appropriate form and dimensions to receive a wire end or other object to be attached thereto. It will also be apparent that an open portion to receive a binding post or other support may be formed either by perforating the flattened portion or by slotting the same.

The attachment terminal, embodying the above described invention, may be constructed of brass or any other suitable material.

It is understood that the invention is not intended to be limited to the specific forms herein disclosed for the purpose of illustration, but includes modifications and variations thereof within the scope of the appended claims.

What I claim is:—

1. An attachment terminal comprising a tubular structure having a relatively large portion at one end and a relatively small portion at the other, one of said portions being flattened and having a part thereof removed to form an open portion adapted to receive a binding post.

2. An attachment terminal comprising a tubular structure relatively large at one end and relatively small at the other, the larger end being flattened and having a portion removed therefrom to form an open portion adapted to receive a binding post.

3. An attachment terminal comprising a tubular structure relatively large at one end and relatively small at the other, the larger end being flattened and slotted to provide a pair of prongs adapted to straddle a binding post.

4. The method of making an attachment terminal which consists in forming, from a blank of metal, a tubular structure having one end portion of larger diameter than the other, flattening one of said end portions, and removing a part of said flattened end portion to provide an open portion adapted to receive a binding post.

5. The method of making an attachment terminal which consists in drawing, from a blank of metal, a tubular structure having a relatively large open end portion and a relatively small closed end portion, removing the disk of metal from the closed end of said structure, flattening the large open end portion thereof, and slotting the flattened portion to provide a pair of prongs adapted to straddle a binding post.

In witness whereof, I have hereunto signed my name.

ALLAN B. COLBY.